United States Patent
Sarkar et al.

(10) Patent No.: US 9,037,758 B1
(45) Date of Patent: May 19, 2015

(54) DYNAMIC VIRTUAL MACHINE (VM) INPUT-OUTPUT PER SECOND (IOPS) CONTROL BASED ON APPLICATION IO PROFILING AND VM IO USAGE TREND ANALYSIS

(71) Applicant: VMware, Inc., Palo Alto, CA (US)

(72) Inventors: Prasenjit Sarkar, Bangalore (IN); Duncan Gerardus Cornelis Antonius Epping, Utrecht (NL); Vineet Kumar Sinha, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/072,919

(22) Filed: Nov. 6, 2013

(51) Int. Cl.
*G06F 3/00* (2006.01)
*G06F 3/06* (2006.01)
*G06F 9/455* (2006.01)

(52) U.S. Cl.
CPC ............ *G06F 3/0613* (2013.01); *G06F 3/0653* (2013.01); *G06F 3/0673* (2013.01); *G06F 9/455* (2013.01)

(58) Field of Classification Search
CPC ... H04L 1/0002; H04L 43/0894; H04L 47/10; G06F 3/0613
USPC ............................ 710/29, 60, 18, 33; 709/233
See application file for complete search history.

(56) References Cited

U.S. PATENT DOCUMENTS

| | | | |
|---|---|---|---|
| 7,257,640 B1 * | 8/2007 | Callocchia et al. | 709/233 |
| 8,688,878 B1 * | 4/2014 | Dolan et al. | 710/74 |
| 2010/0274920 A1 * | 10/2010 | Kunii et al. | 709/233 |

OTHER PUBLICATIONS

VMware, Inc., vSphere 4.1, technical white paper, "Storage I/O Control Technical Overview and Considerations for Deployment," retrieved online Nov. 22, 2013, from: http://www.vmware.com/files/pdf/techpaper/VMW-vSphere41-SIOC.pdf (12 pgs).
VMware, Inc., vSphere "Storage I/O Control," retrieved online Nov. 22, 2013, from: http://www.vmware.com/in/products/vsphere/features-storage-io-control (6pgs).
Duncan Epping, "Limit a VM from an IOps perspective," Apr. 29, 2013, retrieved online from: http://www.yellow-bricks.com/2013/04/29/limit-a-vm-from-an-iops-perspective (2pgs).

* cited by examiner

*Primary Examiner* — Ernest Unelus (57) ABSTRACT

Embodiments of the present invention include systems and methods for controlling input-output (IO) requests of a plurality of virtual machines to a datastore. The method includes: monitoring, for each virtual machine, a throughput of IO to a datastore for a preset time interval; identifying a peak value of the throughput; calculating a value of input-output-per-second (IOPS) using the peak value; and setting the value of IOPS as an IOPS limit for a corresponding virtual machine.

20 Claims, 6 Drawing Sheets

DYNAMIC VIRTUAL MACHINE (VM) INPUT-OUTPUT PER SECOND (IOPS) CONTROL BASED ON APPLICATION IO PROFILING AND VM IO USAGE TREND ANALYSIS

TECHNICAL FIELD

The present invention relates to controlling input-output (IO) performance of virtual machines (VMs), more particularly, to systems and methods for dynamically controlling IO performance of virtual machines based on IO profiles and usage trends of the virtual machines.

DESCRIPTION OF THE RELATED ART

Controlling the dynamic allocation of resources in distributed systems has been a long-standing challenge. Virtualized environments introduce further challenges because of the inherent sharing of physical resources by multiple virtual machines. Existing software applications have provided ways to manage shared physical resources, such as CPU and memory, for the virtualized environments and to prioritize their use among all the virtual machines in the virtualized environments. CPU and memory controls have worked well since the memory and CPU resources are shared only at a local-host level for virtual machines residing within a single VM host server.

Figure 1A:
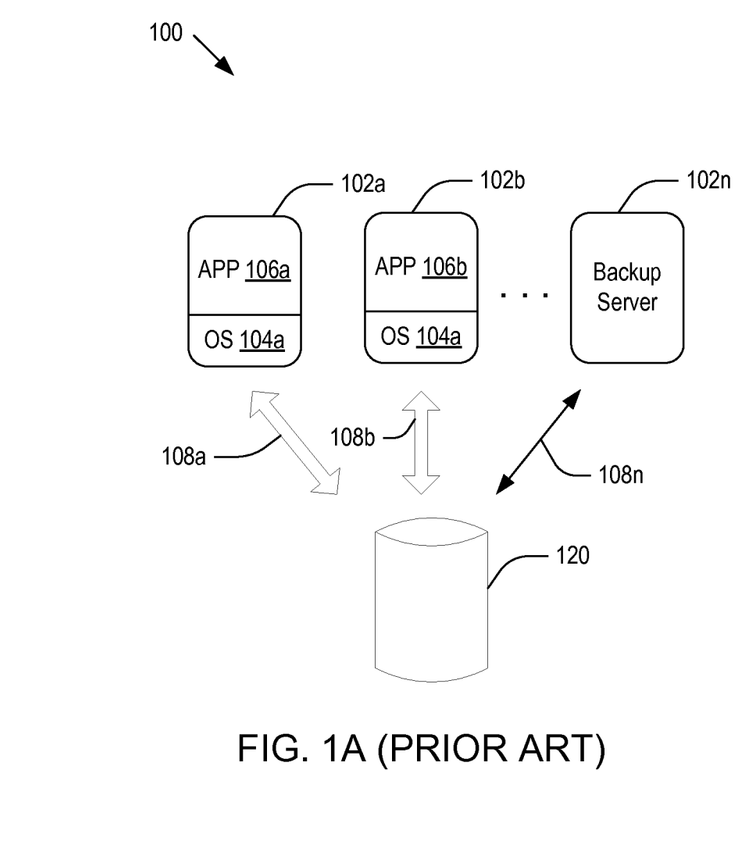
FIG. 1A shows a conventional virtualized environment under an ideal operational condition.

However, the task of regulating shared resources that span multiple VM host servers, such as shared datastores, presents new challenges since these resources are accessed in a distributed manner by multiple VM host servers. Conventional approaches to share disk storage do not address this challenge, as the shares and limits were enforced only at a single VM host server level, and were only enforced in response to host-side host-bus-adaptor (HBA) bottlenecks, which occur rarely. These approaches have the problem of potentially allowing lower-priority virtual machines to have greater access to storage resources based on their placement across different VM host severs. FIG. 1A shows a typical virtualized environment 100 having multiple virtual machines 102a-102n. The virtual machines (VMs) 102a-102n are installed on multiple VM host servers (not shown in FIG. 1 for brevity), and access a datastore 120 via the VM host servers. The customer of the virtual environment would like to allocate greater IO access to the high-priority virtual machines 102a and 102b than the low-priority virtual machine 102n, such as a backup server. The high-priority virtual machines 102a-102b may include IO sensitive and latency-sensitive applications, such as online stores and Exchange® server, for instance. As depicted in FIG. 1A, the thicknesses of the arrows 108a-108n indicate the intended amounts of IO access for the virtual machines 102a-102n, respectively, in an ideal operational condition.

Figure 1B:
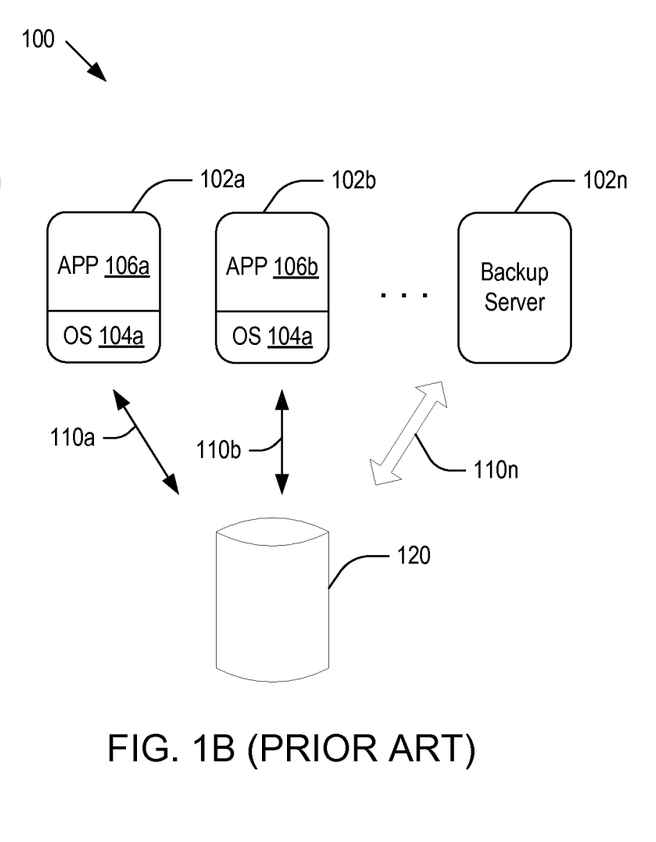
FIG. 1B shows the virtualized environment of FIG. 1A under an actual operational condition where the performance of the virtual machines are significantly degraded by improper IO control.

However, the conventional disk share approaches allocate storage resources based on the placement of virtual machines across multiple VM host servers. Under such existing approaches, the low-priority virtual machine 102n may write enormous amount of data even though it is not necessary to guarantee the virtual machine 102n for that level of IO throughput. FIG. 1B depicts an operational condition where the performance of the high-priority virtual machines 102a and 102b are adversely affected by the low-priority virtual machine 102n. As depicted by arrows 110a-110n, the low-priority virtual machine 102n gets a significant portion of access to the datastore 120 while the high-priority virtual machines 102 and 102b are not getting enough throughput for proper operations thereof.

As such, there is a need for systems and methods for controlling IO performance of virtual machines that share common datastore resources.

SUMMARY OF THE INVENTION

In embodiments, a computer-implemented method for controlling input-output (IO) requests of a plurality of virtual machines to a datastore includes: monitoring, for each virtual machine, a throughput of IO to a datastore for a preset time interval; identifying a peak value of the throughput; calculating a value of input-output-per-second (IOPS) using the peak value; and setting the value of IOPS as an IOPS limit for a corresponding virtual machine.

In embodiments, a computer readable medium or media comprising a set of instructions for controlling input-output (IO) requests of a plurality of virtual machines to a datastore, wherein execution of the set of instructions by one or more processors causes the one or more processors to perform the steps of: monitoring, for each virtual machine, a throughput of IO to a datastore for a preset time interval; identifying a peak value of the throughput; calculating a value of IOPS using the peak value; and setting the value of IOPS as an IOPS limit for a corresponding virtual machine.

In embodiments, a system for controlling IO requests of a virtual machine to a datastore includes at least one server that is adapted to monitor a throughput of IO to a datastore for a preset time interval, identify a peak value of the throughput, calculate a value of IOPS using the peak value, and using the value of IOPS to set an IOPS limit for the virtual machine.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Also, it shall be noted that steps or operations may be performed in different orders or concurrently, as will be apparent to one of skill in the art. And, in instances, well known process operations have not been described in detail to avoid unnecessarily obscuring the present invention.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules. Components or modules may be implemented in software, hardware, or a combination thereof.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 2:
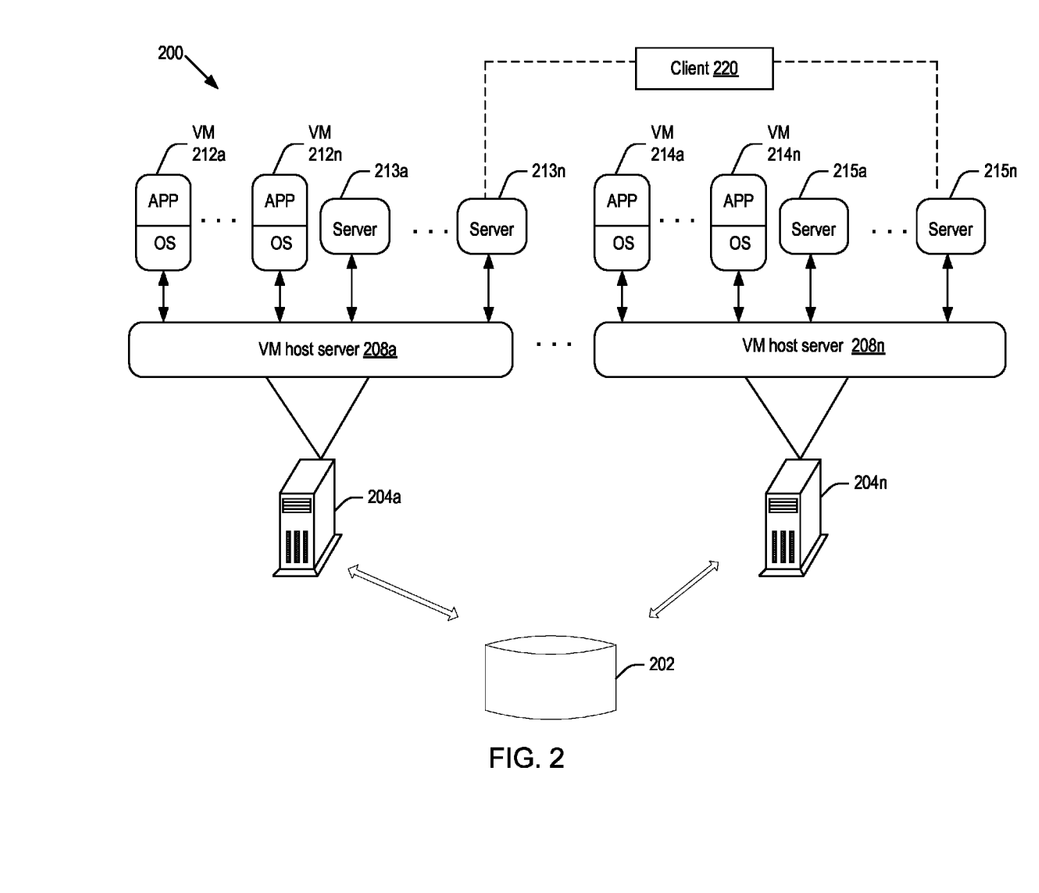
FIG. 2 shows an exemplary virtualized environment according to embodiments of the present invention.

FIG. 2 shows an exemplary virtualized environment 200 according to embodiments of the present invention. As depicted, the virtualized environment 200 includes a datastore 202 that is coupled to and shared by multiple computers 204a-204n. Each of the computers 204a-204n provides a physical computing platform to a corresponding one of VM host servers 208a-208n. Each of the VM host servers 208a-208n, which are also known as hypervisors, hosts multiple VMs. For instance, the VM host server 208a may host one or more VMs 212a-212n and one or more servers 213a-213n. The server 213a may be a backup server of low-priority, for instance, and the server 213n may be a centralized management application, such as (by way of illustration and not limitation) vCenter® server, by VMware of Palo Alto, Calif., that allows the system administrator to manage virtual machines 212a-212n and the servers 213a-213n. In one embodiment, the server 213n may be coupled to a client application 220, such as (by way of illustration and not limitation) vSphere® by VMware of Palo Alto, Calif., client application, that is used by the system administrator to access the server 213n and ultimately manage the VM host server 208a. The VM host server 208n may host one or more VMs 214a-214n and one or more servers 215a-215n, where the server 215n may be similar to the server 213n, i.e., the server 215n may be a centralized management application that performs the similar functions as the server 213n and coupled to the client application 220.

Each of the VMs 212a-212n and 214a-214n may include an operating system that executes an application, such as online store, for instance. Hereinafter, the term VMs collectively refers to the VMs 212a-212n and servers 213a-213n.

Since the VM host servers 208a-208n share the datastore 202, one VM host server may affect the performance of VMs hosted by other VM host servers. For instance, if the VM host server 208a were to issue a large number of IO requests on behalf of its backup server 213a so that the backup server 213a could write enormous amount of data, the other VMs 214a-214n, which may be IO intensive or latency-sensitive applications, would not have any access to the datastore 202, significantly degrading the performance of the VMs 214a-214n. The present invention prevents such an undesirable allocation of IO access to the datastore 202 by dynamic storage IO control.

In the present invention, dynamic storage IO control is performed by use of IO profile, where a server, say 213n, attaches an IO profile to each VM installed in the VM host server 208a. In one embodiment, the system administrator uses a client application 220 coupled to the server 213n to attach an IO profile to the VM 212a. The IO profile includes one or more parameters, such as IO block size.

IO block size refers to a fixed length of a block, which is a sequence of bytes or bits and used to facilitate the handling of data-stream by a VM receiving or sending data from the datastore 202. The IO block size may be set based on standard business critical applications. In one embodiment, a default IO block size may be assigned to each VM. In another embodiment, the application executed by a VM may have its own IO block size. In yet another embodiment, if the IO block size of a VM is not known, the system administrator may assign a proper IO block size inferred from other VM that executes a similar application.

Figure 3:
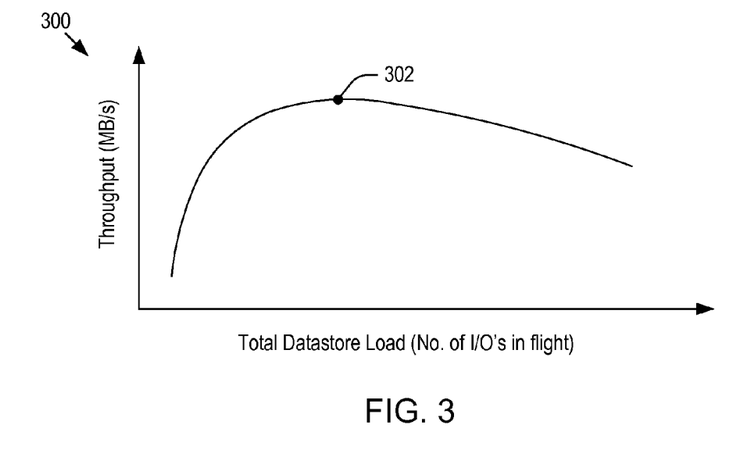
FIG. 3 shows a plot of throughput as a function of the number of IOs in flight for a virtual machine in FIG. 2 according to embodiments of the present invention.

After attaching an IO profile to a VM, the server 213n continuously monitor the VM's throughput for a preset time interval, such as 7 days (although other time intervals or even varying time intervals may be used), using a software tool, such as Vscsistats® software or Esxtop® software. FIG. 3 shows a plot 300 of throughput as a function of the number of IOs in flight for a VM, say 212a. Here, the throughput refers to disk IO in the unit of MB/sec but other metric may be used. As depicted in the trend plot 300, the throughput has a peak value at a point 302, beyond which the throughput decreases as the number of IOs in flight increases. Thus, there is no benefit of allocating higher input-output-per-second (IOPS) than calculated at the peak point 302. The number of IOPS at the peak point 302 can be calculated by an equation $$\text{Number of IOPS} = (1024/\text{IO block size}) * \text{peak throughput}, \quad (1)$$

where the IO block size is in the unit of kilobytes.

In embodiments, the number of IOPS calculated by Equation (1) is an IOPS limit applied to the VM 212a in the subsequent time interval, to thereby prevent the VM 212a from utilizing more datastore resource than is required for its optimum operation. The server 213n monitors the other VMs hosted by the VM host server 208a and sets an IOPS limit to each VM. Also, the server 213n continuously repeats the step of monitoring the throughput of each VM, identifying the peak point 302 and setting a new IOPS limit at each preset time interval, to thereby dynamically control the storage IO without further human intervention.

In embodiments, a different value than the peak throughput may be used. For example, a value within a set region or threshold level may be used. For example, Equation 1 may be modified to be based upon 90% of the peak throughput.

In embodiments, the plot 300 in FIG. 3 may be used to help a system administrator understand each VM's IO trend. In embodiments, based on the trend analysis, the system administrator may manually set or adjust the IOPS limits to either relax or increase the IOPS limits, even though the servers 213n and 215n can automatically set the IOPS limits at the end of each time interval. For instance, the system administrator may analyze the IO trend of a VM at the end of each month and adjust the IOPS limit of the VM based on the trend analysis.

Figure 4:
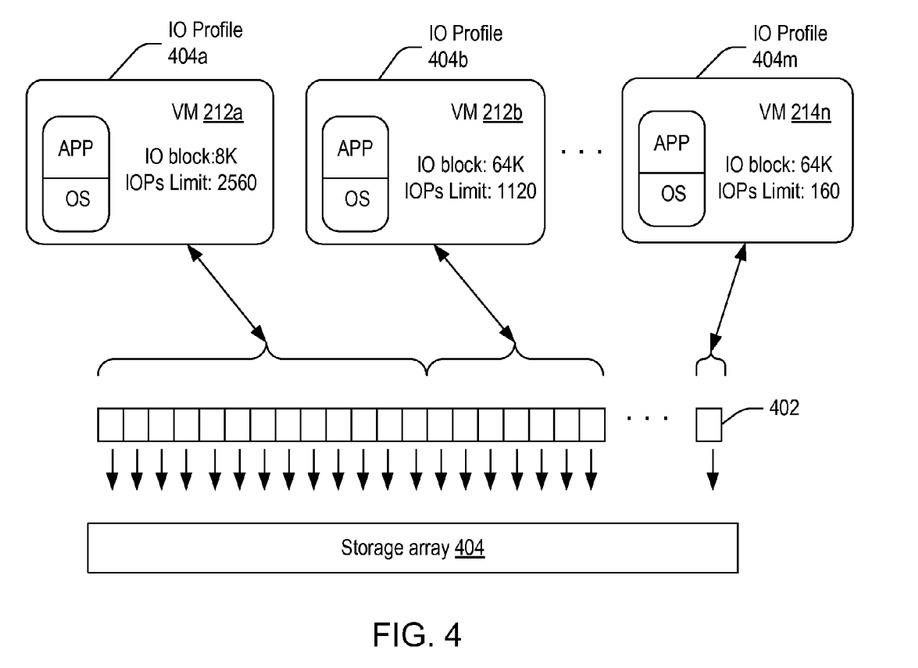
FIG. 4 shows exemplary IO profiles attached to the virtual machines of FIG. 2 according to embodiments of the present invention.

FIG. 4 shows exemplary IO profiles 404a-404m attached to the virtual machines 212a-214n of FIG. 2 according to embodiments of the present invention. As depicted, the IO profile of each VM includes IO block size and the IOPS limit calculated by Equation (1) at a time interval. The IO request slots 402 are apportioned and allocated to each VM in proportion to the IOPS limits of the VMs. As such, the number of IO requests to the data storage array 404 for one VM may be affected by the number of IO requests by other VMs.

Figure 5:
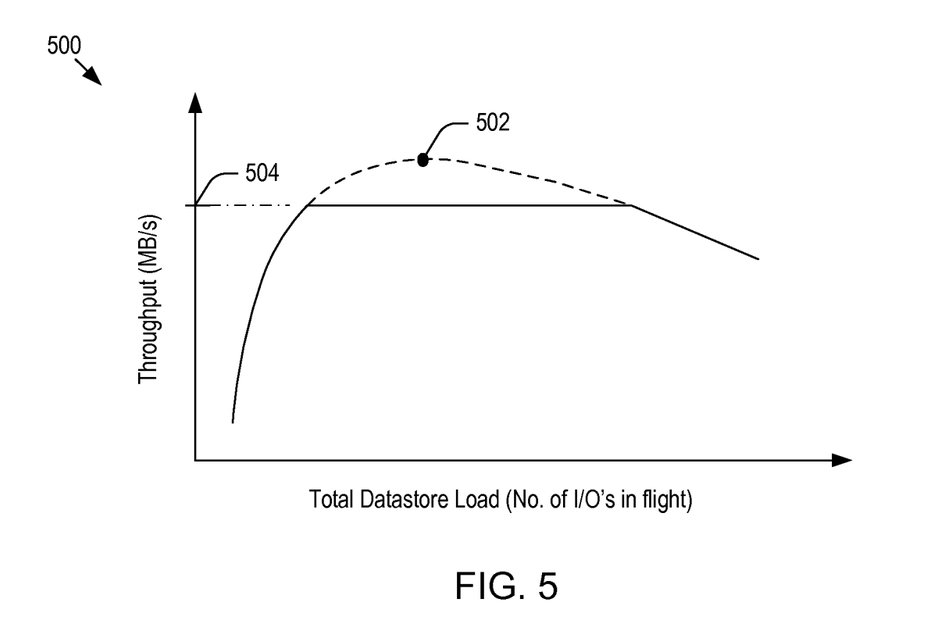
FIG. 5 shows a plot of throughput saturated due to the underestimated IOPS limit according to embodiments of the present invention.

As discussed in conjunction with FIG. 3, an IOPS limit for a VM in the subsequent time interval is calculated by monitoring the peak throughput of the VM in the current time interval. Thus, the IOPS limit calculated by Equation (1) is based on the assumption that the peak throughput in the subsequent time interval is the same as or less than the peak throughput in the current time interval. However, if the actual peak throughput in the subsequent time interval is higher than that of the current time interval, the throughput monitored in the subsequent time interval will be saturated. FIG. 5 shows a plot 500 of throughput saturated due to the underestimated peak throughput (i.e., underestimated IOPS limit) set in the previous time interval. As depicted, the actual throughput may have a peak point 502 while the monitored throughput is flattened out by the ceiling of the underestimated peak throughput 504, where the underestimated peak throughput is the peak value of the throughput monitored in the previous time interval.

To prevent the saturation, in embodiments, the server 213n may allow the system administrator to specify a tolerance so that the IOPS limit calculated by Equation (1) is adjusted according to the tolerance. The tolerance may be a factor to be multiplied to the calculated IOPS limit or a certain number of IOPS to be added to the calculated IOPS limits so that the throughput corresponding to the adjusted IOPS limit is higher than the actual peak throughput in the subsequent time interval. Alternatively, the system administrator may manually adjust the IOPS limit based on the trend plot of FIG. 3 or other factors such as expected IO loads, importance of data, load factors, etc.

Figure 6:
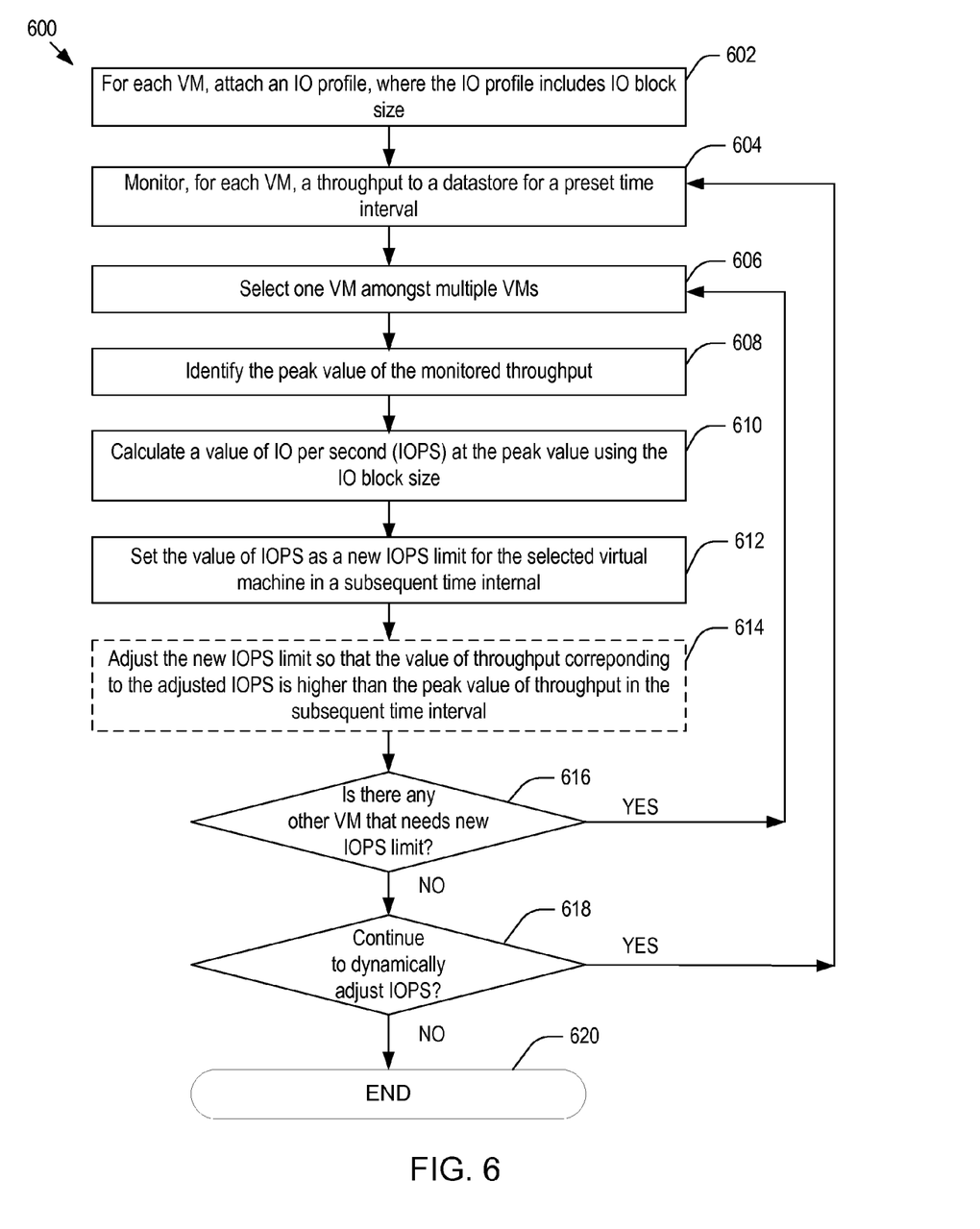
FIG. 6 shows a flowchart of an illustrative process for controlling IO requests of multiple virtual machines to a datastore according to embodiments of the present invention.

FIG. 6 shows a flowchart of an illustrative process 600 for controlling IO requests of multiple virtual machines to a datastore according to embodiments of the present invention. In embodiments, the process starts at step 602. At step 602, a system administrator attaches an IO profile to each VM, where the IO profile includes an IO block size. In embodiments, a default IO block size may be assigned to each VM. In other embodiments, the application executed by a VM may have its own IO block size. In yet other embodiments, if the IO block size of a VM is not known, the system administrator may assign a proper IO block size inferred from other VM that executes a similar application.

To attach an IO profile to a VM, the system administrator may access a centralized management server through the client server 220. For instance, the system administrator may access the server 213n to attach an IO profile to the VM 212a. Then, at step 604, the server 213n monitors, for each VM, a throughput to the datastore 202 during a preset time interval, such as 7 days (although other time intervals may be used). In one embodiment, the monitored throughput of each VM may be plotted as a function of the number of IOs in flight. The server 213n selects one VM amongst the VMs 212a-212n and identifies the peak value of the throughput of the selected VM at steps 606 and 608, respectively. Subsequently, the server 213n calculates the number of IOPS at the peak value of the throughput. In embodiments, Equation (1) may be employed at step 610 to calculate the number of IOPS. Then, the calculated IOPS is set as a new IOPS limit for the selected VM in a subsequent time interval, such as 7 days, at step 612.

In embodiments, the IOPS limit calculated at step 612 is based on the assumption that the peak throughput in the subsequent time interval is the same as the peak throughput in the current time interval. If the actual peak throughput in the subsequent time interval is higher than that of the current time interval, the throughput monitored in the subsequent time interval will be saturated. To prevent the saturation, in embodiments, the server 213n may include a tolerance so that the IOPS limit calculated by Equation (1) is adjusted according to the tolerance at the optional step 614. The tolerance may be a factor to be multiplied to the calculated IOPS limit (i.e., a constant may be multiplied to the right hand side of Equation (1)) or a certain number of IOPS to be added to the calculated IOPS limit so that the throughput corresponding to the adjusted IOPS is higher than the actual peak throughput in the subsequent time interval. Alternatively, the system administrator may manually adjust the IOPS limit based on the analysis of the trend plot of FIG. 3. Then, the process proceeds to step 616.

At step 616, the server 213n determines whether there is any other VM that needs a new IOPS limit. If the answer to the step 616 is positive, the process proceeds to step 606 so that steps 606-614 are repeated until every VM has a new IOPS limit. Otherwise, the process proceeds to step 618. In embodiments, at step 618, the IOPS limit(s) have been set and the monitoring may be stopped at step 620. Alternatively, in embodiments, the IOPS limit(s) may be dynamically monitored on a continuous basis. For example, the subsequent time interval may be set as the current time interval and the process proceeds to step 604 to repeat steps 604-616.

It is noted that, in embodiments, the server 213n monitors the throughputs of VMs hosted by the VM host server 208a and sets new IOPS limits for the VMs at each time interval, i.e., the server 213*n* continuously and dynamically controls the storage IO without further human intervention. In embodiments, the monitored throughput for each VM helps system administrator understand the throughput trend in a preset time interval to thereby assist him to manage the usage of datastore resources in the subsequent time interval.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 7:
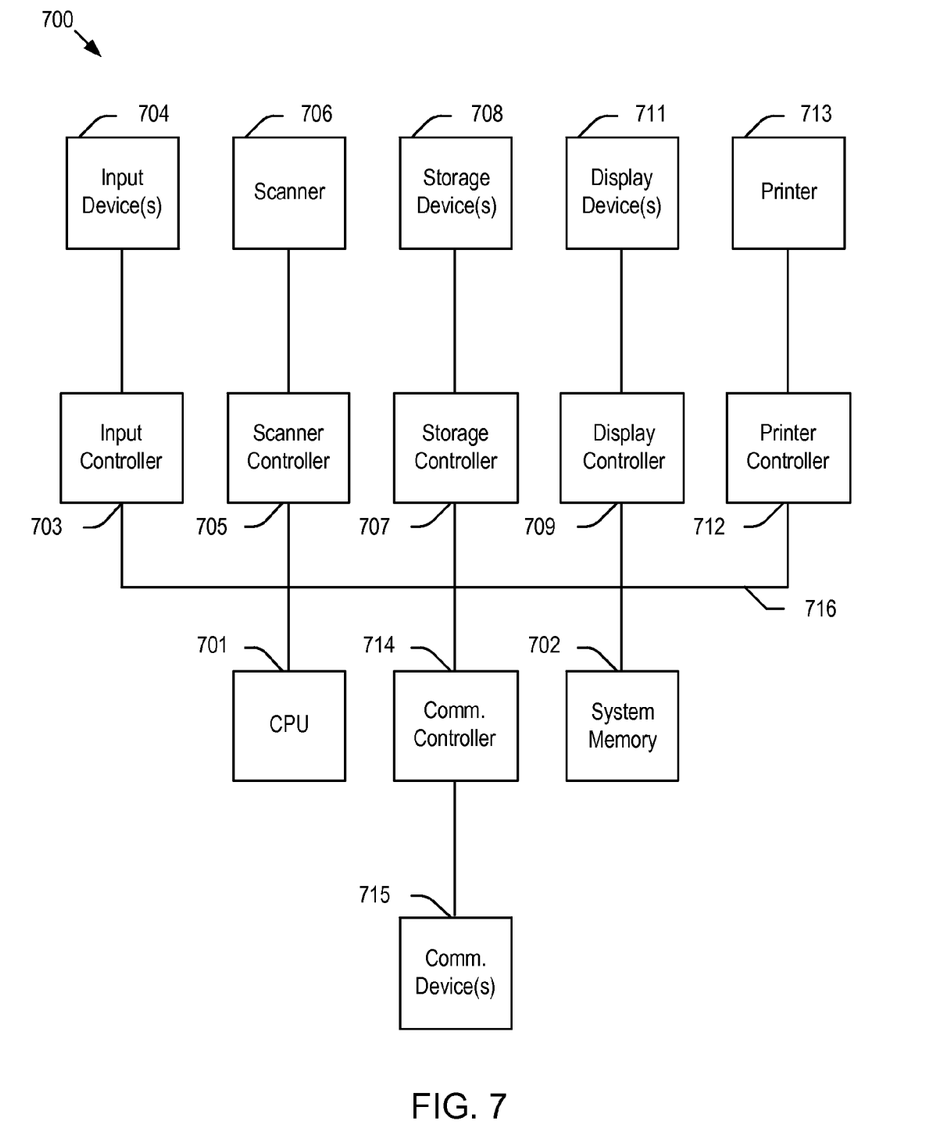
FIG. 7 shows a computer system according to embodiments of the present invention.

Having described the details of the invention, an exemplary system 700, which may be used to implement one or more aspects of the present invention, will now be described with reference to FIG. 7. As illustrated in FIG. 7, system 700 includes a central processing unit (CPU) 701 that provides computing resources and controls the computer. CPU 701 may be implemented with a microprocessor or the like, and may also include a graphics processor and/or a floating point coprocessor for mathematical computations. System 700 may also include a system memory 702, which may be in the form of random-access memory (RAM) and read-only memory (ROM).

A number of controllers and peripheral devices may also be provided, as shown in FIG. 7. An input controller 703 represents an interface to various input device(s) 704, such as a keyboard, mouse, or stylus. There may also be a scanner controller 705, which communicates with a scanner 706. System 700 may also include a storage controller 707 for interfacing with one or more storage devices 708 each of which includes a storage medium such as magnetic tape or disk, or an optical medium that might be used to record programs of instructions for operating systems, utilities and applications which may include embodiments of programs that implement various aspects of the present invention. Storage device(s) 708 may also be used to store processed data or data to be processed in accordance with the invention. System 700 may also include a display controller 709 for providing an interface to a display device 711, which may be a cathode ray tube (CRT), a thin film transistor (TFT) display, or other type of display. System 700 may also include a printer controller 712 for communicating with a printer 713. A communications controller 714 may interface with one or more communication devices 715, which enables system 700 to connect to remote devices through any of a variety of networks including the Internet, a local area network (LAN), a wide area network (WAN), or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for controlling input-output (IO) requests of a plurality of virtual machines to a datastore, comprising:
   monitoring, for each virtual machine, a throughput of IO to a datastore for a preset time interval;
   identifying a peak value of the throughput in the preset time interval;
   calculating a value of IO per second (IOPS) by performing the steps comprising dividing the peak value of the throughput by an IO block size, and, when needed, multiplying by a conversion factor; and
   setting the value of IOPS as an IOPS limit for a corresponding virtual machine.

2. A computer-implemented method as recited in claim 1, further comprising:
   attaching an IO profile to each virtual machine, the IO profile including one or more parameters,
   wherein the step of calculating a value of IOPS is performed using at least one of the parameters.

3. A computer-implemented method as recited in claim 2, wherein the parameters include the IO block size and the step of calculating a value of IOPS is performed by use of an equation:

$$IOPS=(1024/IO\ block\ size)*t*(peak\ value\ of\ the\ throughput),$$

wherein t is a positive value and wherein the IO block size is in kilobytes and the peak value of the throughput is in megabytes per second.

4. A computer-implemented method as recited in claim 3, wherein t is equal to 1.

5. A computer-implemented method as recited in claim 1, wherein the preset time interval is one week.

6. A computer-implemented method as recited in claim 1, further comprising:
   repeating from the step of monitoring the throughput to the step of setting the value in a subsequent time interval to thereby dynamically renew the IOPS limit for the subsequent time interval.

7. A computer-implemented method as recited in claim 1, further comprising:
   adjusting the IOPS limit so that a value of throughput corresponding to the adjusted IOPS limit is higher than the peak value of the throughput in a subsequent time interval.

8. A computer-implemented method as recited in claim 7, the step of adjusting includes adding a tolerance to the IOPS limit.

9. A computer-implemented method as recited in claim 7, the step of adjusting includes multiplying a tolerance factor to the IOPS limit.

10. A non-transitory computer-readable medium or media comprising a set of instructions for controlling input-output (IO) requests of a plurality of virtual machines to a datastore, wherein execution of the set of instructions by one or more processors causes the one or more processors to perform the steps of:
    monitoring, for each virtual machine, a throughput of IO to a datastore for a preset time interval;
    identifying a peak value of the throughput in the preset time interval;
    calculating a value of IO per second (IOPS) by performing the steps comprising dividing the peak value of the throughput by an IO block size, and, when needed, multiplying by a conversion factor; and
    setting the value of IOPS as an IOPS limit for a corresponding virtual machine.

11. The non-transitory computer-readable medium or media of claim 10, wherein execution of the set of instructions by one or more processors causes the one or more processors to perform the additional step of attaching an IO profile to each virtual machine, wherein the IO profile includes one or more parameters and the step of calculating a value of IOPS is performed using the parameters.

12. The non-transitory computer-readable medium or media of claim 11, wherein the parameters include the IO block size and the step of calculating a value of IOPS is performed by use of an equation:

$$IOPS=(1024/IO\ block\ size)*(peak\ value\ of\ the\ throughput),$$

wherein the IO block size is in kilobytes and the peak value of the throughput is in megabytes per second.

13. The non-transitory computer-readable medium or media of claim 10, wherein execution of the set of instructions by one or more processors causes the one or more processors to perform the additional step of repeating from the step of monitoring the throughput to the step of setting the value in a subsequent time interval to thereby dynamically renew the IOPS limit at each time interval.

14. The non-transitory computer-readable medium or media of claim 10, wherein execution of the set of instructions by one or more processors causes the one or more processors to perform the additional step of adjusting the IOPS limit so that a value of throughput corresponding to the adjusted IOPS limit is higher than the peak value of the throughput in a subsequent time interval.

15. A system for controlling input-output (IO) requests of a virtual machine to a datastore, comprising:
    at least one server configured to:
       monitor a throughput of IO to a datastore for the virtual machine for a preset time interval;
       identify a peak value of the throughput in the preset time interval;
       calculate a value of IO per second (IOPS) by performing the steps comprising dividing the peak value of the throughput by an IO block size, and, when needed, multiplying by a conversion factor; and
    using the value of IOPS to set an IOPS limit for the virtual machine.

16. A system as recited in claim 15, wherein the server is adapted to calculate the value of IOPS by using the IO block size of the virtual machine.

17. A system as recited in claim 15, wherein the server is adapted to set the IOPS limit in at least one subsequent time interval.

18. A system as recited in claim 15, wherein the server is adapted to adjust the IOPS limit so that a value of throughput corresponding to the IOPS limit is higher than the peak value of the throughput in a subsequent time interval.

19. A system as recited in claim 18, wherein the server is adapted to adjust the IOPS by adding a tolerance to the IOPS limit.

20. A system as recited in claim 18, wherein the server is adapted to adjust the IOPS by multiplying a tolerance factor to the IOPS limit.

* * * * *